United States Patent [19]

O'Connor

[11] Patent Number: 4,685,172
[45] Date of Patent: Aug. 11, 1987

[54] BUSH SECURING MECHANISM

[75] Inventor: Dermot J. O'Connor, Ascot, England

[73] Assignee: Data Recording Instrument Company Limited, Staines, United Kingdom

[21] Appl. No.: 858,204

[22] Filed: May 1, 1986

[30] Foreign Application Priority Data

May 7, 1985 [GB] United Kingdom ................. 8511529

[51] Int. Cl.⁴ .......................... F16L 5/00; F16L 57/00
[52] U.S. Cl. .................................... 16/2; 16/DIG. 42; 29/432; 248/56; 384/537; 384/906
[58] Field of Search ............ 16/2, DIG. 42; 384/537, 384/906; 29/432, 432.1, 432.2, 525; 248/56; 285/24, 27, 162; 174/65 G, 152 G, 153 G

[56] References Cited

U.S. PATENT DOCUMENTS

| 2,794,691 | 6/1957 | Noe | 384/537 X |
| 4,329,768 | 5/1982 | Tranberg et al. | 29/432 X |
| 4,376,333 | 3/1983 | Kanamaru | 29/432 |
| 4,474,489 | 10/1984 | Simon | 174/153 G X |

Primary Examiner—Fred Silverberg
Attorney, Agent, or Firm—Lee, Smith & Zickert

[57] ABSTRACT

A bush element for supporting a rod or shaft in a side plate has portion for entry into a generally circular aperture in the side plate. The portion of the bush has tooth shaped projections extending radially outwardly such that the overall diameter of the portion exceeds that of the aperture. The aperture is enlarged at a position to receive the projections so that rotation of the bush in the side plate results in the extremities of the teeth being cut away by the side plate to ensure a precise fit of the bush in the side plate.

7 Claims, 5 Drawing Figures

BUSH SECURING MECHANISM

This invention relates to bushes for locating one element in another element and in particular to means for ensuring a precise fit of a bush in one of the elements.

Instead of mounting and locating one element directly in another element it is often desired to use a bush to locate the elements relative to one another. In order to save costs in manufacture it is convenient to manufacture the bushes by a moulding process rather than by a more costly machining process. However due to manufacturing tolerances it is difficult to ensure that the moulded bush is a precise fit in the element and that there is no play between the bush and the elements.

SUMMARY OF THE INVENTION

According to one aspect of the invention a bush element intended for reception in an aperture defined by part circular walls comprises a portion for entry into the aperture and having a part circular wall for engagement with the part circular wall of the aperture and one or more projections extending radially outwardly diametrically opposite the part circular portion of the bush such that the dimension of the bush is slightly larger than the dimension of the aperture into which it is intended to be inserted; said projections having a configuration to facilitate removal of material therefrom by engagement of the bush in the aperture.

In a preferred form of bush construction for location in a planar member, the aperture in the planar member is of generally circular form with two oppositely directed enlarged portions and the bush has a part circular portion for entry into the circular portion of the aperture, two oppositely directed lugs for passing through the enlarged portions of the aperture to extend on the opposite side of the planar member and a plurality of outwardly directed teeth extending from the part circular portion adjacent one of the lugs whereby upon entry of the part circular portion into the aperture and subsequent rotation of the bush to cause the lugs to engage the opposite side of the planar member, the projections are engaged by the intersection of the circular portion of the wall of the aperture and the wall of one of the enlarged portions of the aperture to cause removal of sufficient material to ensure a precise fit of the bush in the aperture.

According to another aspect of the invention a method of fitting a bush to a structural member includes the steps of forming an aperture in the member defined by two diametrically opposed part circular edges and an enlarged area between said edges; forming a bush element comprising a portion having diametrically opposite part circular walls, the diameter of the walls being slightly less than the diameter of the part circular edges; providing at least one projection extending outwardly from one of said part circular walls; inserting the portion into the aperture in the member with the projection extending into said enlarged area and then turning the bush element to cause the projection to be engaged by one of the part circular edges and thereby remove material from the projection such that the portion of the bush element fits precisely in the circular aperture.

BRIEF DESCRIPTION OF THE DRAWINGS

An embodiment of the invention will now be described with reference to the drawings in which.

DESCRIPTION OF THE PREFERRED EMBODIMENT

Figure 1:
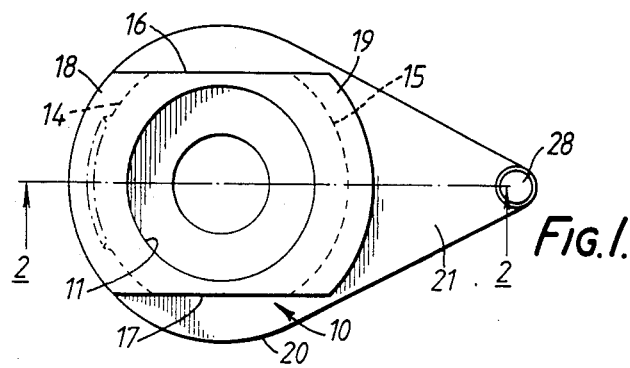
FIG. 1 is a front view of a bush element.
Figure 2:
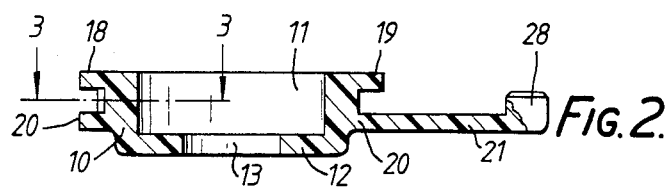
FIG. 2 is a sectional view on the line 2—2 of FIG. 1.
Figure 3:
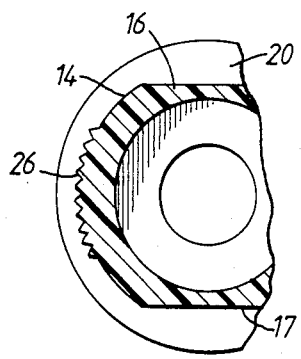
FIG. 3 is a sectional view on the line 3—3 of FIG. 2.

Referring first to FIGS. 1, 2 and 3 which show a construction of bush element for receiving a ball race, a bush 10 has a central recess 11 into which a ball race (not shown) may be inserted. The recess is partially closed by a wall 12 to provide a locating seat for the ball race. The wall 12 has an aperture 13 therein to permit a shaft rotatably supported by the ball race to extend through the bush. The exterior of the bush is defined by two part circular walls 14, 15 and two parallel straight walls 16, 17. One end of the bush is formed with a pair of lugs 18, 19 which extend beyond the part circular walls 14, 15 respectively. The other end of the bush is formed with a plate 20 having a generally circular portion of larger radius than the part circular walls 14, 15 and a portion 21 extending away from the bush 10 to form a lever. Thus it will be seen that the plate and the lugs form between them part circular grooves adjacent the part circular walls 14, 15. It is preferred to fabricate the bush element by a moulding process from a plastics material which is relatively rigid and inflexible.

Figure 5:
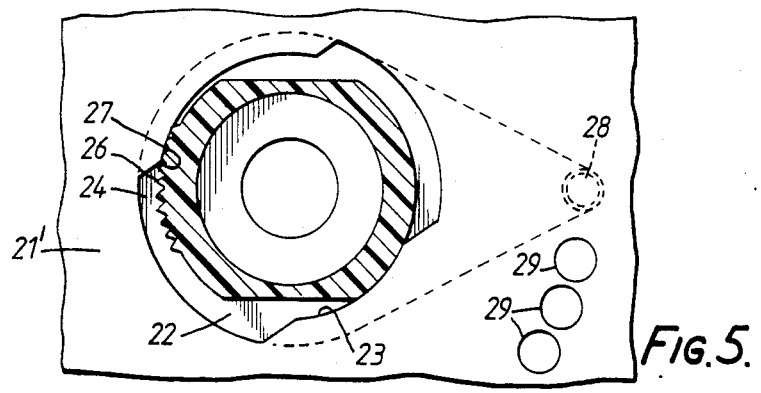
FIG. 5 illustrates the insertion of a bush element into a structural member.

A structural member 21' into which the bush is to be inserted has an aperture 22 formed therein consisting of a circular portion 23 having a radius slightly larger than the radius of the part circular walls of the bush and two diametrically opposite portions 24, 25 configured to permit the passage of the lugs 18, 19 therethrough. Thus by aligning the end of the bush on which the lugs are formed with the aperture in the structural member the bush may be inserted by an axial movement into the aperture until the plate 20 abuts the face of the member 21'. The bush may then be rotated by means of the lever 21 to cause the lugs to move away from the diametrically opposite portions 24, 25 of the aperture and engage the opposite face of the member 21 and thereby secure the bush in the member. It will be realised that if the radius of the part circular walls is less than that of the circular portion of the aperture the bush will be free to move in the member. However if the walls have a larger radius it may prove to be impossible to insert the bush in the aperture. Due to manufacturing tolerances it is impracticable to ensure that the bush walls have precisely the dimension necessary to ensure a precise fit of the bush in the member. In order to overcome this problem one of the part circular walls 16 is formed with a plurality of tapered tooth shaped projections 26 which extend radially outwardly from the general curvature of the wall. If reference is now made to FIG. 5 it will be seen that as the bush is inserted in the aperture and then rotated by means of the lever, the projections 26 are engaged by an edge 27 formed on the member 21' by the junction of the circular part 23 of the aperture 22 and the portion 24 of the aperture. As a result the outer parts of the projetions 26 are cut away by this edge 27 to an extent such that the remaining parts of the teeth together with the other part circular wall 15 have an overall diameter precisely equal to that of the circular portion 23 of the aperture. Hence the part circular wall 15 forms a reference surface which is held in engagement with the part circular edge of the aperture by means of the projections 26 engaging a diametrically opposite wall of the aperture. The end of the lever 21 is provided with a projection 28 arranged to enter a recess 29 in the member and thereby lock the bush 10 in its fully engaged position relative to the member 21'.

Figure 4:
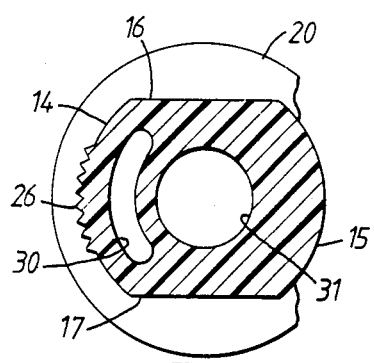
FIG. 4 is a sectional view similar to that of FIG. 3 of a modified construction of bush element.

When the bush is used as a plain bearing for a shaft which is required to rotate or move axially in the bush, a slot 30 may be formed in the bush 10 as shown in FIG. 4 to avoid distortion of the bore 31 in the bush due to pressure arising from engagement of the remaining portions of the projections with the wall of the aperture 22 in the 15 member 21'.

It will be realised that various modifications may be made to the bush element in accordance with the function to be performed by the bush. For example when it is desired to locate a shaft or rod in an axial direction, the aperture 13 in the wall may be dispensed with. Also although in the illustrated constructions of bush elements the part circular walls 14, 15 are concentric with the recess 11 or bore 31 in the bush, if desired they may be eccentric so that the rotation of the bush during its insertion in the member causes the rod or shaft to be moved in a direction perpendicular to its axis. Such a facility may be useful where it is required to move the rod or shaft into engagement with another element after it has been located axially. In addition this facility may be used where it is desired to provide fine adjustment of the position of the rod or shaft. Rotation of the bush through an angle, insufficient to allow release of the bush, will cause lateral movement of the rod or shaft. The required position of the rod or shaft may be maintained by providing a series of recesses 29 into one of which the projection 28 enters to retain the bush in the required position.

I claim:

1. A bush construction for location in an aperture in a planar member, the aperture in the planar member being of generally circular form with two opposite enlarged areas, the bush including a part circular portion for entry into the circular portion of the aperture, two oppositely directed lugs for passing through the enlarged areas of the aperture to extend on an opposite side of the planar member and a plurality of outwardly directed teeth extending from the part circular portion adjacent one of the lugs whereby upon entry of the part circular portion into the aperture and subsequent rotation of the bush to cause the lugs to engage the opposite side of the planar member, the projections are engaged by an end of a part circular edge of the aperture to cause removal of sufficient material to ensure a precise fit of the bush in the aperture.

2. A bush element as claimed in claim 1 in which said teeth have a configuration in the form of a tapered tooth.

3. A bush element as claimed in claim 1 including means operative to retain the element in an aperture of a structural member.

4. A bush element as claimed in claim 3 in which the retaining means comprises a flange operative to engage one face of the structural member and the oppositely directed lugs operative to engage an opposite face of the member.

5. A bush element as claimed in claim 4 including locating means operable to engage the structural member to retain the bush in a selected rotational position relative to the member.

6. A bush element as claimed in claim 1 moulded of substantially rigid plastics material.

7. A method of fitting a bush to a structural member including the steps of forming an aperture in the member defined by two diametrically opposed part circular edges and an enlarged area between said edges; forming a bush element comprising a portion having diametrically opposite part circular walls, the diameter of the walls being slightly less than the diameter of the part circular edges; providing at least one projection extending outwardly from one of said part circular walls; inserting the portion into the aperture in the member with the projection extending into said enlarged area and then turning the bush element to cause the projection to be engaged by one of the part circular edges and thereby remove material from the projection such that the portion of the bush element fits precisely in the circular aperture.

* * * * *